(12) United States Patent
Silvestre et al.

(10) Patent No.: US 6,580,706 B1
(45) Date of Patent: Jun. 17, 2003

(54) EFFICIENT GENERATION WITHIN A REMOTE BASE STATION OF A SYNCHRONIZATION SIGNAL FOR A CORDLESS COMMUNICATION SYSTEM

(75) Inventors: Philippe Silvestre, Callian (FR); Roland M. van der Tuijn, Mougins (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/312,778

(22) Filed: May 17, 1999

Related U.S. Application Data

(62) Division of application No. 08/525,890, filed on Sep. 8, 1995, now Pat. No. 5,978,369.

(51) Int. Cl.[7] .................................................. H04J 3/06
(52) U.S. Cl. ........................ 370/350; 370/503; 375/362
(58) Field of Search ................................. 370/324, 328, 370/350, 503, 509, 513; 375/354, 356, 357, 359, 362; 455/450, 451, 452, 502, 509; 331/46, 49, 55

(56) References Cited

U.S. PATENT DOCUMENTS 5,426,633 A * 6/1995 Tanaka et al. .............. 370/103
5,627,832 A * 5/1997 Tanaka et al. .............. 370/508
5,636,219 A * 6/1997 Tanaka et al. .............. 370/513

* cited by examiner

Primary Examiner—Alpus H. Hsu
(74) Attorney, Agent, or Firm—Peter Zawilski (57) ABSTRACT

A first synchronization signal is used by a master base station and a remote base station in a digital cordless communication system. The master base station generates a second synchronization signal. The second synchronization signal is used to transfer information over a transmission medium between the master base station and the remote base station. The master base station generates the first synchronization signal from the second synchronization signal. Information is transferred over the transmission medium between the master base station and the remote base station using the second synchronization signal. The remote base station generates the first synchronization signal from the second synchronization signal. The first synchronization signal is utilized by the master base station and the remote base station for digital cordless communication.

15 Claims, 7 Drawing Sheets

EFFICIENT GENERATION WITHIN A REMOTE BASE STATION OF A SYNCHRONIZATION SIGNAL FOR A CORDLESS COMMUNICATION SYSTEM

CROSS REFERENCE TO RELATED APPLICATION

This application is a division of application Ser. No. 08/525,890, filed Sep. 8, 1995, now U.S. Pat. No. 5,978,369.

BACKGROUND

The present invention concerns the field of digital communication and pertains particularly to efficient generation within a remote base station of a synchronization signal for a cordless communication system.

A cordless telephone system generally includes a fixed part, which connects a telephone network to one or more base stations. Base stations are generally connected to a fixed part by wires, or may be integrated directly with the fixed part. For example, a system may include a master base station and several remote base stations connected by a wire highway to the master base station. Each base station communicates with one or more portable parts, typically a handset, via a radio frequency (RF) signal link. For example, the cordless system may be included in a private branch exchange (PBX) and utilize a cordless telephone system in accordance with the Digital European Cordless Telecommunications (DECT) Common Interface.

For example, the base stations may be connected together using a data highway operating in accordance with a voice coding algorithm such as an Adaptive Pulse Code Modulation (ADPCM) highway. An ADPCM highway utilizes four wires to connect the base stations. For each base station, one wire carries a synchronization signal (ADPCM.FS), one wire carries a clock signal (ADPCM.CLK), one wire carries data in to the base station (ADPCM.DIP) and one wire carries data out from the base station (ADPCM.DOP).

When a system includes more than one base station which utilize the DECT common interface, each base station must transmit messages in synchronization with a system wide DECT frame synchronization signal. In order to assure proper synchronization, the DECT frame synchronization signal is forwarded by a master source to each remote base station over a dedicated wire.

SUMMARY OF THE INVENTION

In accordance with the preferred embodiment of the present invention, a first synchronization signal is used by a master base station and a remote base station in a digital cordless communication system. The master base station generates a second synchronization signal. The second synchronization signal is used to transfer information over a transmission medium between the master base station and the remote base station. The master base station generates the first synchronization signal from the second synchronization signal. Information is transferred over the transmission medium between the master base station and the remote base station using the second synchronization signal. The remote base station generates the first synchronization signal from the second synchronization signal. The first synchronization signal is utilized by the master base station and the remote base station for digital cordless communication.

For example, in the preferred embodiment the first synchronization signal is a DECT frame synchronization signal and the second synchronization signal is an ADPCM synchronization signal. Also in the preferred embodiment, the first synchronization signal within the remote base station and the master base station is synchronized using the synchronization information sent from the master base station to the remote base station. For example, this synchronization information includes a current count from a counter used by the master base station to generate the first synchronization signal from the second synchronization signal.

In the preferred embodiment, the remote base station uses a lock window signal to filter out parasitic pulses within the second synchronization signal. When a pulse from the second synchronization signal is absent from a lock window, the absent pulse is reconstructed by the remote base station when the remote base station generates a reconstructed second synchronization signal.

The present invention allows for the generation of a DECT frame synchronization signal from an ADPCM frame synchronization signal. This eliminates the need for a master base station to transfer to remote base stations the DECT frame synchronization signal over a dedicated wire.

DESCRIPTION OF THE PREFERRED EMBODIMENT

Figure 1:
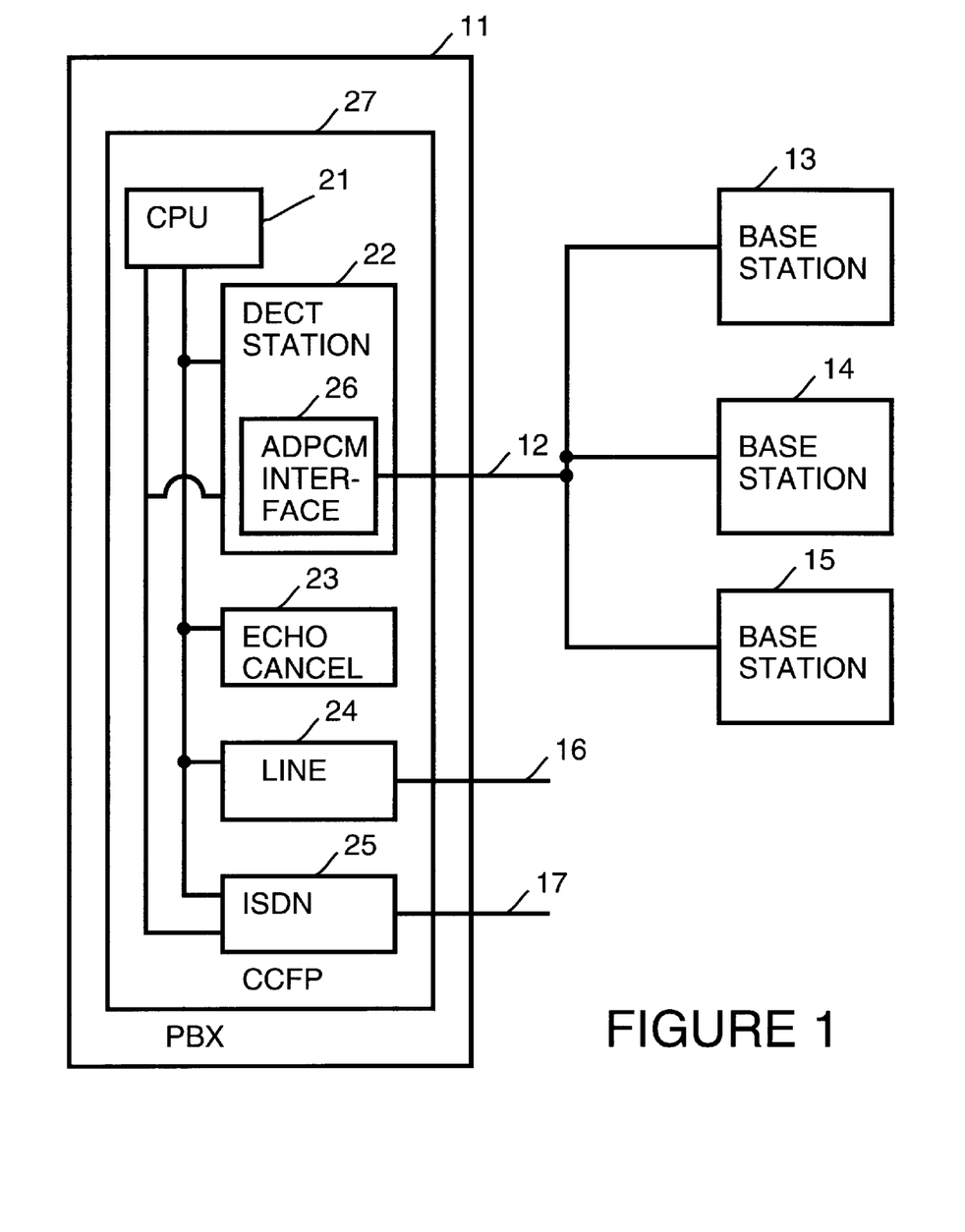
FIG. 1 is a block diagram of a private branch exchange (PBX) which includes a master base station and is connected to three remote base stations.

FIG. 1 shows a public branch exchange (PBX) 11. A common central fixed part (CCFP) 27 within PBX 11 includes a central processing unit (CPU) 21, a Digital European Cordless Telecommunications (DECT) station 22, echo cancel circuitry 23, line circuitry 24 and integrated services digital network (ISDN) circuitry 25. DECT station 22 functions as a master base station.

CPU 21 is for example an 80386 processor available from Intel Corporation, having a business address of 2200 Mission College Boulevard, Santa Clara, Calif. 95050, or a Model Number 68000 processor available from Motorola, Inc., having a business address of P.O. Box 20512, Phoenix Ariz. 85036. Line circuitry 24 connects to a public switching telephone network (PSTN) line 16. Echo cancel circuitry 23 is used to cancel the echo from the far side of PSTN line 16. This is required since DECT introduces a 10 millisecond round trip delay for voice. ISDN circuitry 25 connects CCFP 27 to an ISDN network 17.

A four wire ADPCM highway 12 connects an ADPCM interface 26 within CCFP 27 to a remote base station 13, a remote base station 14 and a remote base station 15.

Figure 2:
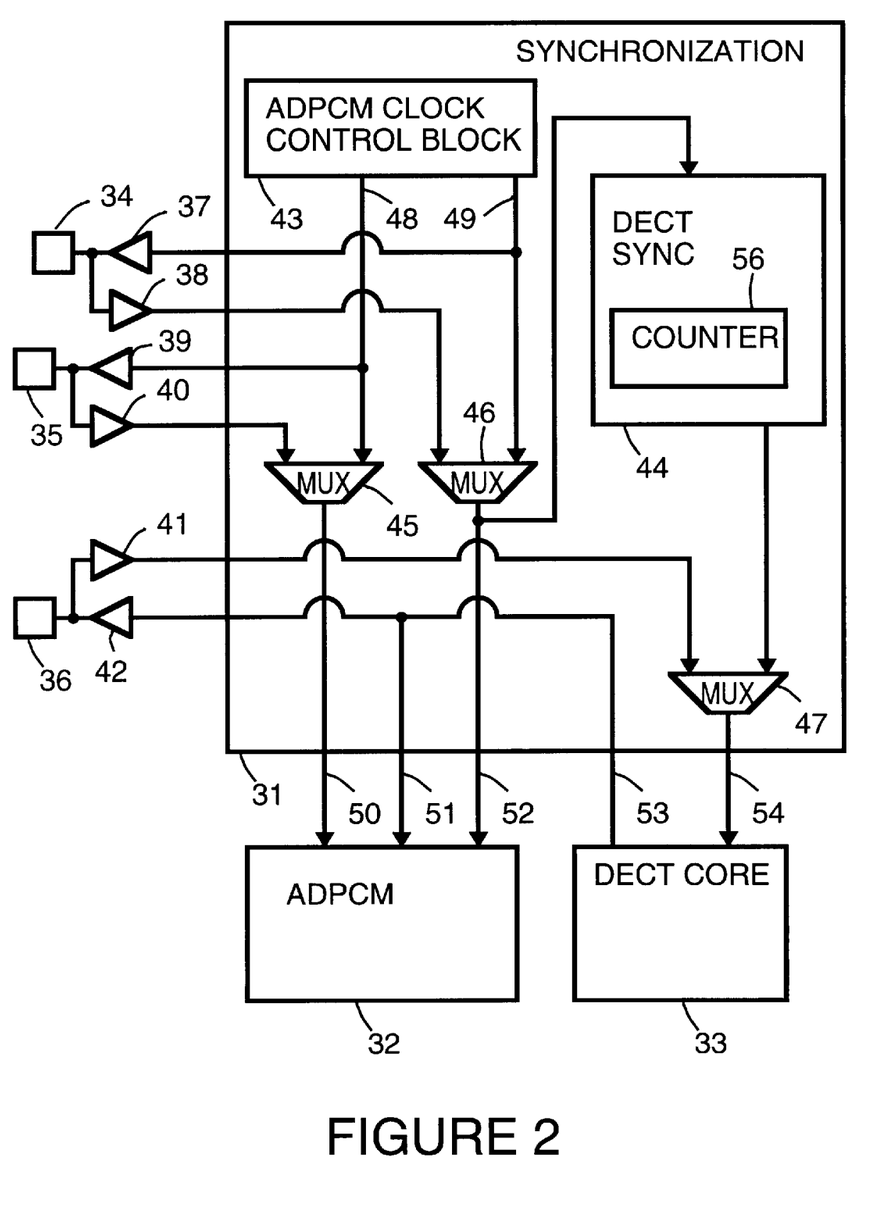
FIG. 2 is a block diagram of synchronization circuitry within each base station in accordance with a preferred embodiment of the present invention.

FIG. 2 shows synchronization circuitry 31 which is used for base stations which are operating either as a master base station or a remote base station. Through an input/output 34, synchronization circuitry 31 receives in or transmits out an ADPCM frame synchronization signal (ADPCM.FS), through a tri-state gate 38 and a tri-state gate 37, respectively. Through an input/output 35, synchronization circuitry 31 receives in or transmits out an ADPCM clock signal (ADPCM.CLK), through a tri-state gate 40 and a tri-state gate 39, respectively. Through an input/output 36, synchronization circuitry 31 receives in or transmits out an DECT frame synchronization signal (DECT.FSYNC), through a tri-state gate 41 and a tri-state gate 42, respectively.

A multiplexor 45 selects an ADPCM clock signal either from input 35 or from a ADPCM clock signal output 48 of an ADPCM clock control block 43 to forward to an ADPCM clock signal input 50 of ADPCM circuitry 32. A multiplexor 46 selects an ADPCM frame synchronization signal either from input 35 or from an ADPCM frame synchronization signal output 49 of ADPCM clock control block 43 to forward to an ADPCM frame synchronization signal input 52 of ADPCM circuitry 32. A multiplexor 47 select an DECT frame synchronization signal either from input 36 or from DECT synchronization circuitry 44 to forward to an DECT frame synchronization signal input 54 to DECT core circuitry 33. DECT core circuitry 33 sends a DECT frame synchronization signal from a DECT frame synchronization signal output 53 to a DECT frame synchronization signal input 51 of ADPCM circuitry 32 and through tri-state gate 42 to input/output 36. DECT synchronization circuitry includes a counter 56. ADPCM block 32 processes data to and from the ADPCM highway. DECT core circuitry 33 processes data to and from the DECT highway. ADPCM block 32 and DECT core circuitry 33 exchange data through a shared memory.

When used in a base station which is acting as a master base station, ADPCM clock control block 48 generates the ADPCM clock signal which is placed on input/output 35 and generates the ADPCM frame synchronization signal which is placed on input/output 34. The DECT frame synchronization signal is generated by the DECT synchronization circuitry 44 from the ADPCM frame synchronization signal received from the output of multiplexor 46.

When used in a base station which is acting as a remote base station, the ADPCM clock signal is received on input/output 35 and the ADPCM frame synchronization signal is received on input/output 34. The DECT frame synchronization signal is generated by the DECT synchronization circuitry 44 from the ADPCM frame synchronization signal received from the output of multiplexor 46. Alternately, DECT frame synchronization signal may be received from input/output 36, for example over a dedicated wire connected to a master base station.

In the preferred embodiment, an ADPCM synchronization pulse is sent at the beginning of every ADPCM frame. Transmission time for an ADPCM frame is 125 microseconds (8 kHz). Each ADPCM frame includes a number of slots of data. These are received or sent using the ADPCM data input signal or the ADPCM.DOP signal, respectively. For example, when ADPCM highway 12 is configured to transfer 2.048 mega bits per second (Mbps), each ADPCM frame includes 64 four-bit slots. When ADPCM highway 12 is configured to transfer 1.536 mega bits per second (Mbps), each ADPCM frame includes 48 four-bit slots. When ADPCM highway 12 is configured to transfer 768 kilo bits per second (Kbps), each ADPCM frame includes 24 four-bit slots. When ADPCM highway 12 is configured to transfer 128 Kbps, each ADPCM frame includes 4 four-bit slots.

Also, in the preferred embodiment, the DECT frame synchronization signal occurs at the beginning of each DECT frame. Each DECT frame synchronization signal is 125 microseconds in duration. In the preferred embodiment, there are twenty-four DECT slots in each DECT frame. Transmission time for the twenty-four DECT slots in a DECT frame is 10 milliseconds, or the equivalent of 80 ADPCM frames.

In order to alleviate the necessity of utilizing an additional line to transmit a DECT frame synchronization signal between each base station, in the preferred embodiment of the present invention, the DECT frame synchronization signal is derived from the ADPCM frame synchronization signal. This is done by use of counter 56 within DECT synchronization circuitry 44. Counter 56 counts eighty ADPCM synchronization pulse signals between issuing a DECT frame synchronization signal.

The count of counter 56 in each base station needs to be synchronized in order to assure that the DECT frame synchronization signal generated by each base station is in synchronization. Synchronization typically occurs whenever the system is powered up. The DECT frame synchronization signal can also be re-synchronized whenever synchronization is lost.

In order to perform synchronization of DECT frame synchronization signal, a master base station sends to each remote base station a synchronization message within a special ADPCM time slot. The message includes a current count of the counter within the DECT synchronization circuitry within the master base station. The remote base station uses this current count to synchronize the count of the counter within the DECT synchronization circuitry within the remote base station.

Figure 3:
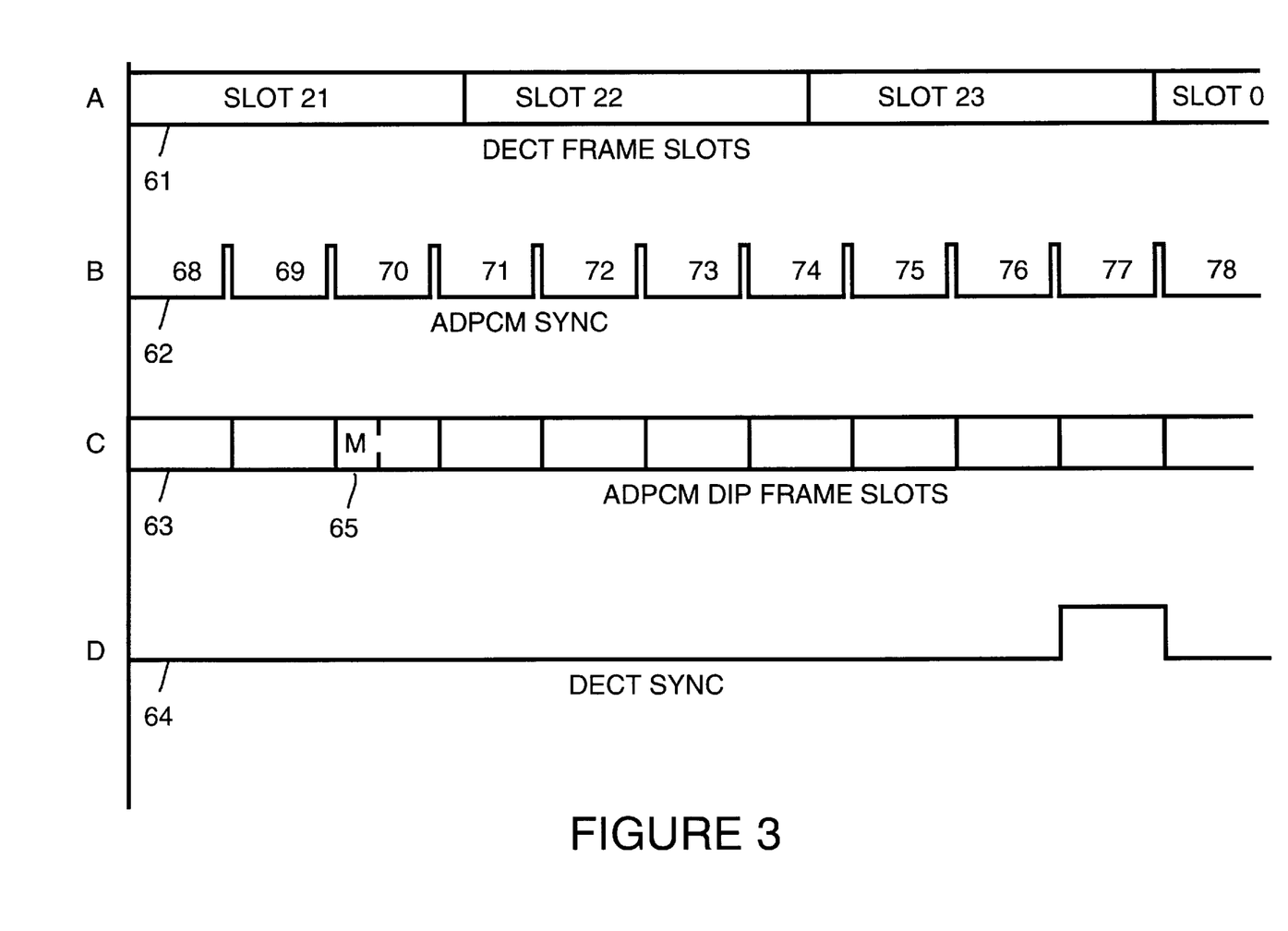
FIG. 3 is a timing diagram which shows relative timing of signals within a master base station in accordance with a preferred embodiment of the present invention.

For example, FIG. 3 is a timing diagram which shows relative timing of DECT frame slots 61, ADPCM frame synchronization signal 62, ADPCM data input signal 63, and DECT frame synchronization signal 64 within a master base station. During ADPCM synchronization frame slot 70, a synchronization message (M) 65 within ADPCM data input signals 63 is sent to the remote base station. During ADPCM synchronization frame slot 70, the counter within the master base station has a current count of 70. The synchronization message (M) 65 includes the current count (70). As also can be seen from FIG. 3, in this embodiment, the DECT frame synchronization signal is asserted during ADPCM synchronization frame slot 77, which corresponds to the end of DECT frame slot 23 and the beginning of DECT frame slot 0.

Figure 4:
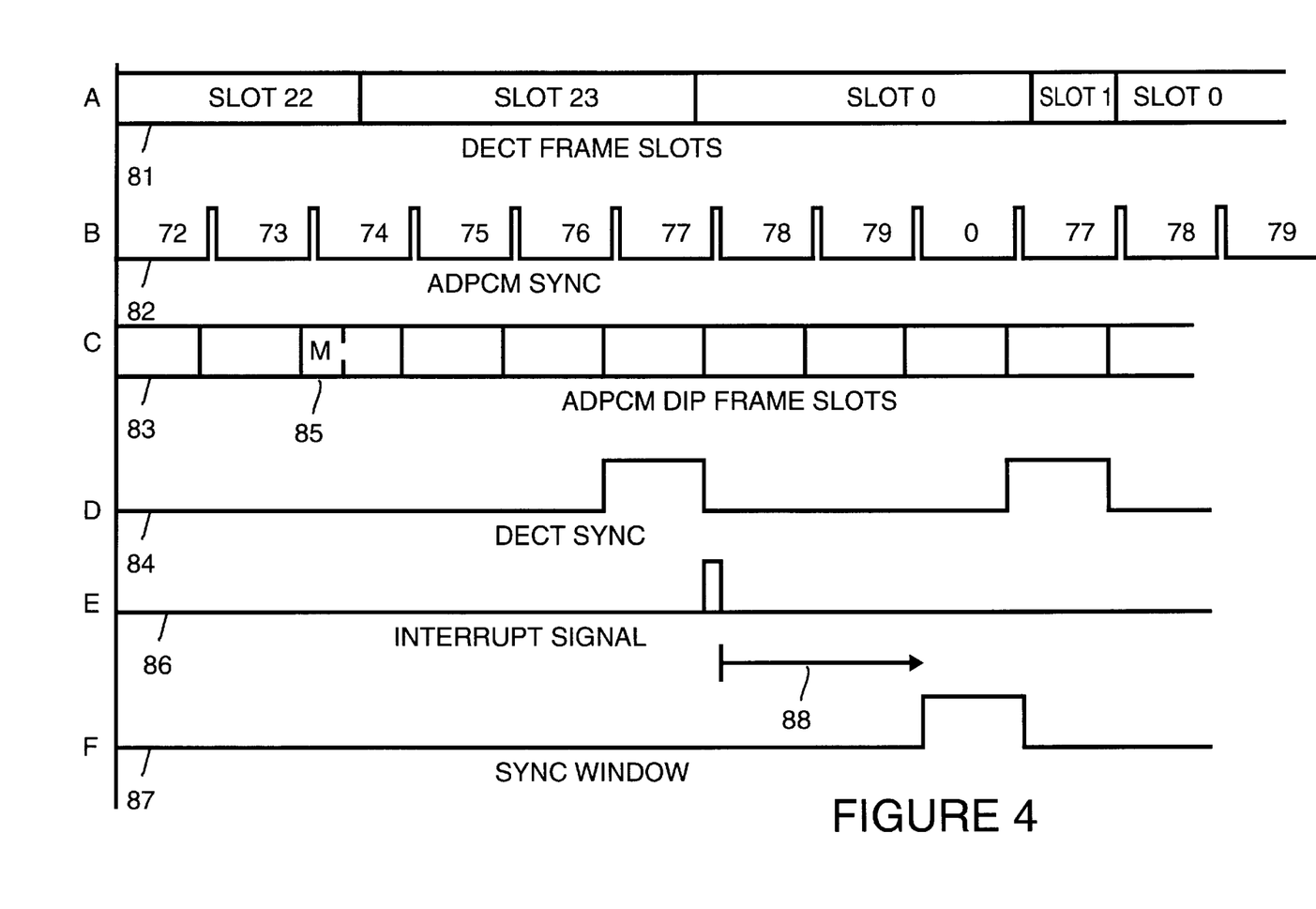
FIG. 4 is a timing diagram which shows relative timing of signals within a remote base station in accordance with a preferred embodiment of the present invention.

FIG. 4 is a timing diagram which shows relative timing of DECT frame slots 81, ADPCM frame synchronization signal 82, ADPCM data input signals 83, and DECT frame synchronization signal 84 within a remote base station. During ADPCM synchronization frame slot 74, the slave station receives the synchronization message (M) 85 within ADPCM data input signals 83 that was sent from the master base station. During ADPCM synchronization frame slot 74, the counter within the remote base station has a current count of 74. The synchronization message (M) 85 includes the current count (70) of the master base station. The synchronization message 85 is used to synchronize the count in the remote base station to the count in the master base station.

In order to do this, after a current DECT frame synchronization signal, the remote base station sets a timer. Upon the expiration of the timer a synchronization window is started. When the remote base station receives a ADPCM frame synchronization pulse signal within the synchronization window, the DECT frame synchronization signal is again triggered and counter 56 is restarted at an appropriate value.

This is illustrated by FIG. 4. There, after receiving synchronization message (M) 85, the remote base station calculates a value for the timer. The value for the timer is equal to the count (74) within the remote base station when the remote base station receives the synchronization message minus the current count (70) of the master base station placed within the synchronization message and further minus 1. In the example shown illustrated in FIG. 4, the timer is equal to the duration of three (74–70–1) ADPCM frames.

As shown in FIG. 4, a DECT frame synchronization signal occurs at ADPCM synchronization slot 77. Upon completion of this first DECT frame synchronization signal an interrupt signal 86 within the remote base station is issued starting the timer 88. Timer 88 waits a period equal to the duration of three ADPCM frame slots (375 microseconds) and then triggers the opening of a synchronization window 87. Upon the remote base station receiving a next ADPCM frame synchronization pulse, the remote base station issues another DECT frame synchronization signal, resets the DECT frame slots 81 and the count of ADPCM frame synchronization signal 82.

In a large system, there may be long distances between master base station 11 and remote base stations 13, 14 and 15, shown in FIG. 1. Due to the long distance, and other factors, transmissions over ADPCM highway 12 can be noisy. This can be a significant problem where, as in the present invention, the DECT synchronization signal is derived from the ADPCM synchronization signal. Therefore a lock window is used to filter out parasitic pulses outside the lock window. In addition, missing ADPCM synchronization pulses are reconstructed.

Figure 5:
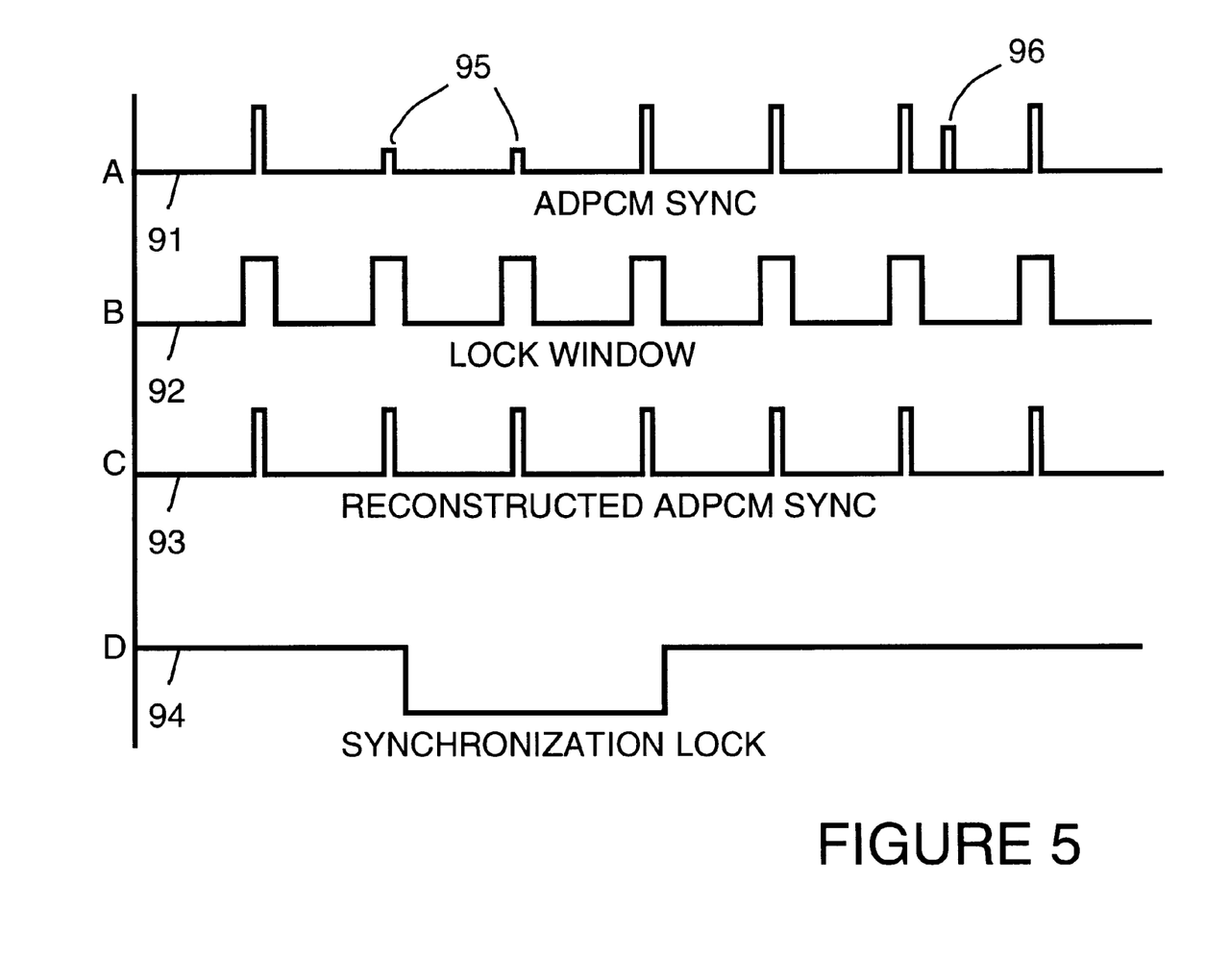
FIG. 5 is a timing diagram which illustrates use of a lock window in accordance with a preferred embodiment of the present invention.

FIG. 5 illustrates the use of a lock window. An ADPCM frame synchronization signal 91 is received by a remote base station from a master base station. Because of noise on the system two ADPCM frame synchronization signal pulses 95 are missing. In addition a parasitic pulse 96 was generated in the transmission.

A lock window signal 92 is used to filter out parasitic pulse 96. In addition, even though two ADPCM frame synchronization signal pulses 95 are missing, these pulses are reconstructed when no pulse is received within the corresponding lock window. The result is reconstructed ADPCM frame synchronization signal 93. A synchronization lock status signal 94 indicates when ADPCM frame pulses are received within lock windows. Synchronization lock status signal 94 retreats to a value of logic zero when expected ADPCM frame synchronization signal pulses 95 are missing. Upon receipt of additional ADPCM frame synchronization signal pulses within each lock window, synchronization lock status signal 94 returns to a value of logic one. The value of synchronization lock status signal 94 may be read by a microprocessor within the remote base station and indicates whether the system is locked in synchronization.

For example, for each ADPCM frame synchronization signal pulse an associated lock window has a duration of 1.6 microseconds, and is centered near the rising edge of the expected ADPCM frame synchronization signal pulse.

Upon power-up, the lock window is wide open to insure a quick synchronization. In typical operation, the lock window is wide open for a period greater than 125 microseconds to be sure to get at least one ADPCM synchronization pulse during the wide open lock window. In practice, a typical value for a wide open lock window is 500 microseconds.

Figure 6:
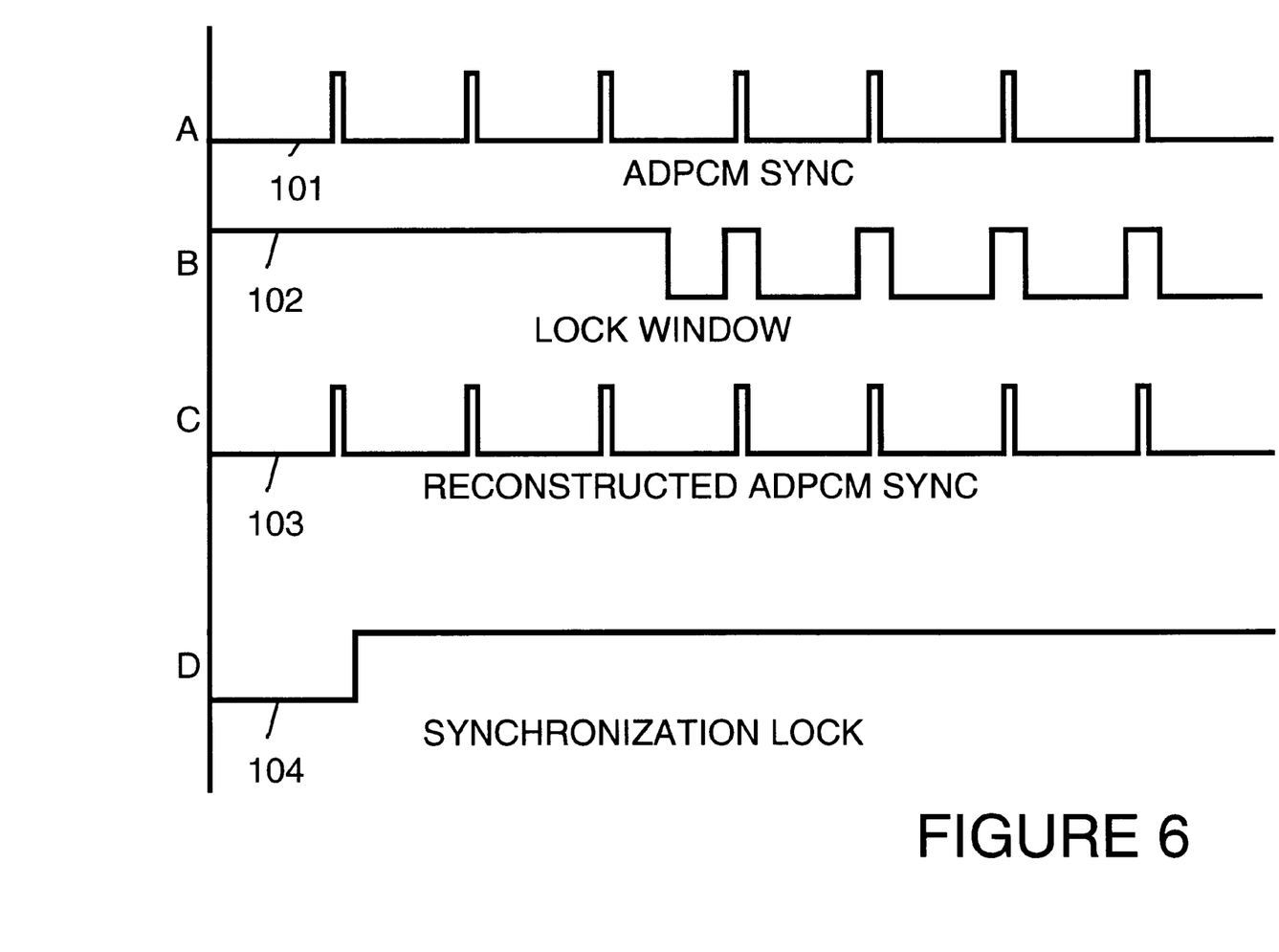
FIG. 6 is a timing diagram which illustrates use of a lock window during initialization in accordance with a preferred embodiment of the present invention.

This is illustrated by FIG. 6 where lock window 102 is shown to be open for the first three pulses of ADPCM frame synchronization signal 101. Once the signal is synchronized, lock window signal 102 is composed of short filtering windows (lock windows). The result is reconstructed ADPCM frame synchronization signal 103. Upon receipt of ADPCM frame synchronization signal pulses, synchronization lock status signal 104 switches to a value of logic one indicating the system is locked in synchronization. When the microprocessor within the remote base station which reads synchronization lock status signal 104 determines that synchronization lock status signal 104 has been at logic one for a sufficient length of time, the microprocessor causes lock window signal 102 to be composed of short filtering windows.

Upon the synchronization lock status signal being at logic zero for a predetermined length of time, for example three or four times the duration of am ADPCM frames (i.e., 3×125 $\mu$s=375 $\mu$s, or 4×125 $\mu$s=500 $\mu$s), the lock window is opened to allow re-synchronization.

Figure 7:
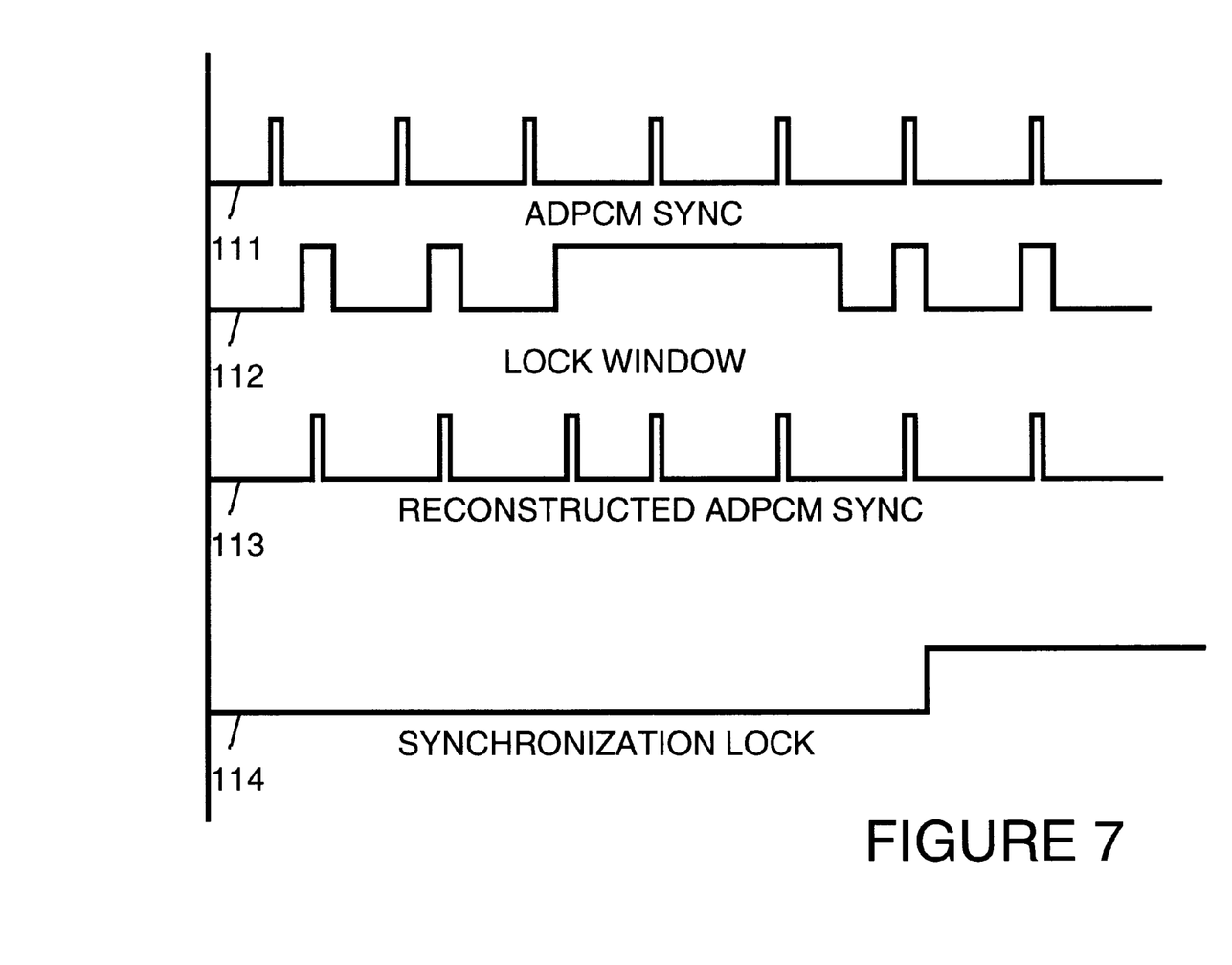
FIG. 7 is a timing diagram that illustrates when a frame synchronization signal is out of synchronization with a lock window.

This is illustrated by FIG. 7 where ADPCM frame synchronization signal 111 is out of synchronization with lock window 112. This is reflected by synchronization lock status signal 114 being at logic zero. As discussed above, even though there is no ADPCM frame synchronization signal pulses detected in the lock windows during this period, pulses are nevertheless generated for reconstructed ADPCM frame synchronization signal 113. When lock window 112 is opened up, reconstructed ADPCM frame synchronization signal 113 is re-synchronized with ADPCM frame synchronization signal 111.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. Circuitry for generating a first synchronization signal and a second synchronization signal comprising:

a first synchronization signal generation means for generating a first synchronization signal;

a first input for receiving the first synchronization signal from a first external source;

a first multiplexor, coupled to the first synchronization signal generation means and to the first input, the muitiplexor for selecting one of the first input or the first synchronization signal generation means to provide the first synchronization signal on an output of the first multiplexor;

a second synchronization signal generation means, coupled to the output of the first multiplexor, the second synchronization signal generation means for extracting a second synchronization signal from the first synchronization signal;

a second input for receiving the second synchronization signal from a second external source; and, a second multiplexor, coupled to the second synchronization signal generation means and to the second input, the second multiplexor for selecting one of the second input or the second synchronization signal generation means to provide the second synchronization signal on an output of the second multiplexor.

2. The circuitry of claim 1 wherein the first synchronization signal is an Adaptive Pulse Code Modulation (ADPCM) synchronization signal and the second synchronization signal is a Digital European Cordless Telecommunication (DECT) frame synchronization signal.

3. The circuitry of claim 1 wherein tic second synchronization signal generation means includes a counter.

4. The circuitry of claim 3 wherein the first synchronization signal is an Adaptive Pulse Code Modulation (ADPCM) synchronization signal and the second synchronization signal is a Digital European Cordless Telecommunication (DECT) frame synchronization signal.

5. The circuitry of claim 4 wherein the counter counts eighty ADPCM synchronization signals between issuing DECT frame synchronization signals.

6. The circuitry of claim 1 wherein the first synchronization generation means is an ADPCM control block.

7. The circuitry of claim 6 wherein the ADPCM control block generates an ADPCM clock signal in addition to the first synchronization signal.

8. The circuitry of claim 7 additionally comprising:

a third input for receiving a clock signal from a third external source;

a third multiplexor coupled to the first synchronization signal generation means and to the third input, the third multiplexor for selecting one of the third input or the ADPCM clock signal generated by the ADPCM clock control block to provide a clock input to ADPCM circuitry.

9. A method for generating a first synchronization signal and a second synchronization signal comprising the following steps:

(a) generating a first synchronization signal using first synchronization signal generation circuitry;

(b) receiving an alternative first synchronization signal from a first external source;

(c) selecting one of the first synchronization signal or the alternative first synchronization signal to be forwarded to first circuitry;

(d) generating a second synchronization signal using second synchronization signal generation circuitry, including the following substeps;

(d1) extracting the second synchronization signal from the one of the first synchronization signal or the alternative synchronization signal selected in step (c);

(e) receiving an alterative second synchronization signal from a second external source; and, (f) selecting one of the second synchronization signal or the alternative second synchronization signal to be forwarded to second circuitry.

10. A method as in claim 9 wherein in step (a) the first synchronization signal is an Adaptive Pulse Code Modulation (ADPCM) synchronization signal and in step (d) the second synchronization signal is a Digital European Cordless Telecommunications (DECT) frame synchronization signal.

11. A method as in claim 9 wherein substep (d.1) includes using a counter to generate the second synchronization signal.

12. A method as in claim 11:

wherein in step (a) the first synchronization signal is an Adaptive Pulse Code Modulation (ADPCM) synchronization signal;

wherein in step (d) the second synchronization signal is a Digital European Cordless Telecommunications (DECT) frame synchronization signal; and, wherein in substep (d.1) the counter counts eighty ADPCM synchronization signals between issuing DECT frame synchronization signals.

13. A method as in claim 9 wherein in step (a) the first synchronization signal generation circuitry is an ADPCM clock control block.

14. A method as in claim 13 wherein step (a) additionally includes the following substep:

generating an ADPCM clock signal by the ADPCM clock control block, the ADPCM clock signal being generated in addition to the first synchronization signal.

15. A method as in claim 14 additionally comprising: the following step:

selecting either a third input or the ADPCM clock signal generated by the ADPCM clock control block in substep (a.1) to provide a clock input to the first circuitry.

* * * * *